United States Patent [19]

Shiao

[11] Patent Number: 5,180,761
[45] Date of Patent: Jan. 19, 1993

[54] POLYMER BASED SELF-LUBRICATION COMPOSITE

[75] Inventor: Shin-Jen Shiao, Hsinchu, Taiwan

[73] Assignee: National Science Council, Taiwan, Taiwan

[21] Appl. No.: 705,583

[22] Filed: May 24, 1991

[51] Int. Cl.$^5$ .............................................. C08K 9/06
[52] U.S. Cl. .................................. 523/213; 523/149; 523/466; 523/468
[58] Field of Search ................. 523/213, 149, 466, 468

[56] References Cited

U.S. PATENT DOCUMENTS

| | | | |
|---|---|---|---|
| 4,093,578 | 6/1978 | Vasiliev et al. | 523/149 |
| 4,465,799 | 8/1984 | Platkiewicz et al. | 523/457 |
| 4,703,075 | 10/1987 | Egami | 524/269 |

Primary Examiner—Paul R. Michl
Assistant Examiner—U. K. Rajguru
Attorney, Agent, or Firm—Marks & Murase

[57] ABSTRACT

Disclosed is a self-lubricating composite material prepared from polymers, used for the fabrication of bearing members. The composite material is characterized by the fillers or solid lubricants contained therein which have been treated with titanates or silane compounds and by the liquid lubricant contained therein which include polar compounds. Bearing members made by this self-lubricating composite material have a lower friction coefficient than commercial self-lubricating bearing members, can use thermoset plastics as a matrix and can be made into colored products.

13 Claims, 1 Drawing Sheet

POLYMER BASED SELF-LUBRICATION COMPOSITE

BACKGROUND OF THE INVENTION

The present invention relates to a self-lubricating composite material, and in particular to a self-lubricating composite material prepared from polymers.

Bearing members made from self-lubricating composite material prepared from polymers have become popular in the friction and lubrication field, because they are self-lubricating, rust-resistant, light in weight, easy-to-produce, low in cost and very compatible. A large percentage of conventional metal bearing members have been gradually replaced by bearing members made from self-lubricating material using polymers as matrix.

Current self-lubricating materials prepared from polymers are made by adding fillers or solid lubricants, such as sulfurated metals, graphites, carbon fibers, carbon blacks, or PTFE to an appropriate polmeric matrix. The function of these fillers or solid lubricants is to reinforce the mechanical strength of the matrix. Although mechanical strength is increased by the addition of fillers or solid lubricants, the friction coefficient of the self-lubricating material is also increased, resulting in an increase in the wearing rate of the self-lubricating material. In view of this, self-lubricating materials containing both liquid lubricants such as greases and fillers or solid lubricants have also been developed for the manufacture of bearing members. However, friction coefficients of bearing members made from the above self-lubricating material have not been satisfactory. For example, under the following conditions: allowable highest load 200 kg/cm$^2$, allowable highest speed 70 m/min, allowable highest PV 2000 kgf/cm$^2$ m/min, and a temperature of $-40°$ C.$-+80°$ C., a self-lubricating bearing member, which uses polyoxymethylene as a matrix and contains more than 4 wt % of grease, has a tested friction coefficient greater than 0.05.

Most conventional matrices used for self-lubricating bearing members are prepared from the abovementioned polyoxymethylene (POM) resin, which is a kind of thermoplastic resin. Thermoset resins have not yet been used as matrices for self-lubricating bearing members. Furthermore, conventional fillers or solid lubricants, such as graphites and carbon blacks, are black in color, and the self-lubricating bearing members made from these conventional fillers are also black.

SUMMARY OF THE INVENTION

Therefore, an object of the present invention is to provide a novel self-lubricating composite material so that the bearing members prepared therefrom have a lower friction coefficient and therefore can be used for a longer time without wear.

Another object of the present invention is to provide a self-lubricating material for bearing members, which can use even thermoset resin as a matrix.

A further object of the present invention is to provide a self-lubricating material for bearing members, which can use white or colorless material such as white carbon, glass powder, as fillers or solid lubricants so that colored bearing members can be produced.

In order to achieve these objects of the present invention, the self-lubricating composite material of the present invention comprises: 100 parts by weight of polymeric materials; 1-15 parts by weight of liquid lubricants, in which 0.1-15 parts by weight of said liquid lubricants are polar compounds; and up to 50 parts by weight of fillers or solid lubricants wherein said fillers or solid lubricants have been treated with 0.2-3 parts by weight on the basis of 100 parts by weight of fillers or solid lubricants of titanates or silane compounds.

The self-lubricating composite material can further comprises 0.1-15 parts by weight of surfactants.

BRIEF DESCRIPTION OF THE DRAWINGS

The present invention can be more fully understood by reference to the following description and accompanying drawing, which forms an integral part of this application.

DETAILED DESCRIPTION OF THE INVENTION

Figure 1:
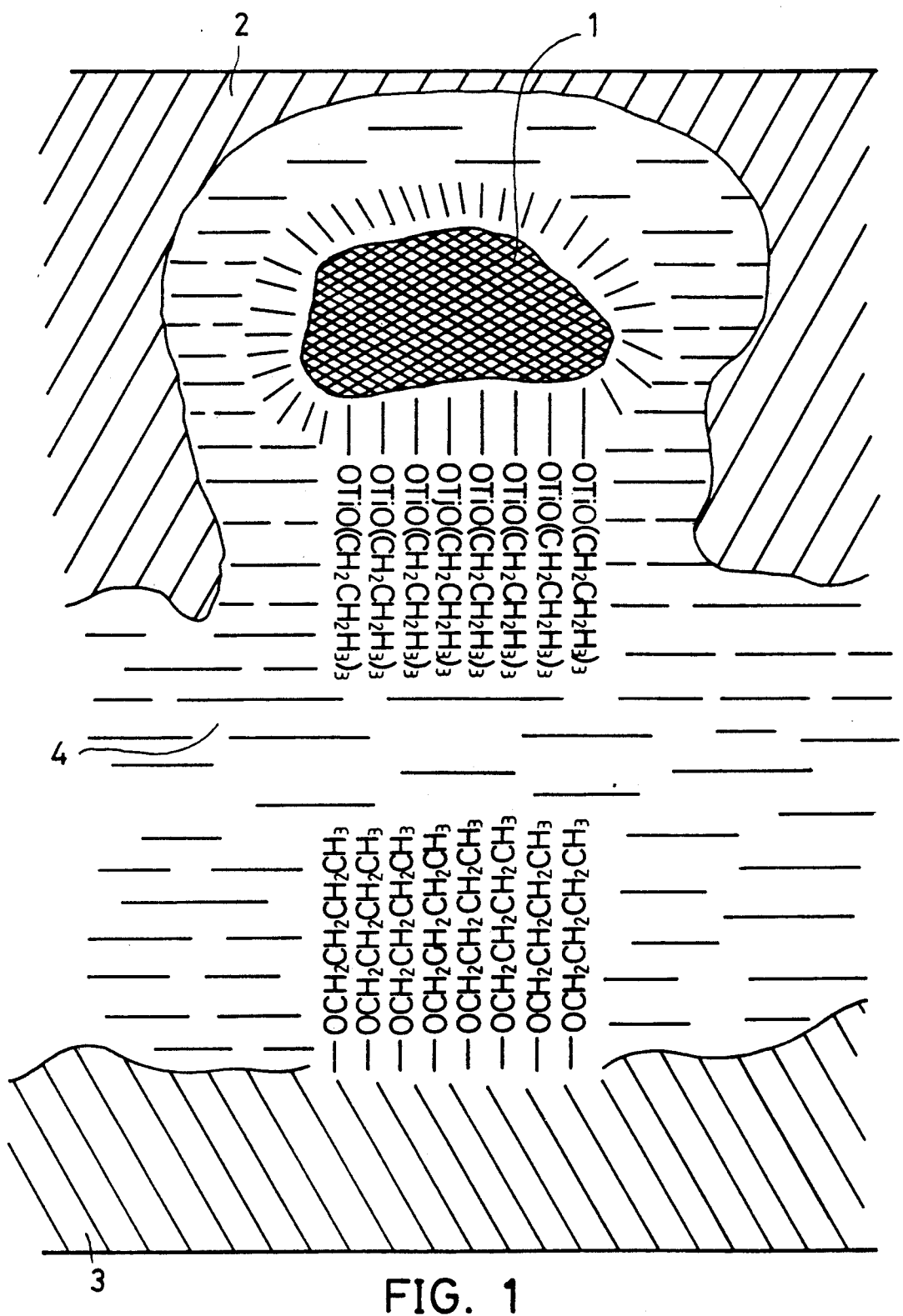
FIG. 1 is a schematic drawing showing the contact of the surface of a bearing member made from the self-lubricating material of the present invention and the surface of a steel shaft.

FIG. 1 shows that one end of each titanate or silane compound is bound to the surface of the filler 1 while the other end of each titanate or silane compound is free. Please note that the function of the titanates or silane compounds of the present invention is different from that of conventional coupling agents for the manufacture of composite material. For coupling agents used in composites the fillers and the matrixes are usually bonded together by coupling agents so as to attain the reinforcement functions of the composite material. Therefore, usually the fillers are first treated with coupling agents and thereafter be blended with or dispersed in polymers. If the fillers or solid lubricants, after being treated with titanates and silane compounds, are first blended with liquid lubricants and thereafter blended with polymers, there will be no binding action between the fillers and the polymers, because liquid lubricants will be disposed between the interfaces of the fillers and the polymers, the binding action of the coupling agents will thus be destroyed or reduced. That is, the invention applies a technique that is usually deemed inappropriate in the manufacturing process of composite materials. Conventional coupling agents are those having two bonding functional groups at their two ends, but the coupling agents used in the invention, i.e., titanates or silane compounds are those having only one bonding functional group at one end of their molecules. According to this, even fillers having high hardness such as, white carbons and glass powders can also be used in the self-lubricating composite material of the present invention. Therefore, colored bearing members can be made from the composite material of the invention.

Another aspect of the invention is the use of polar lubricants. Referring to FIG. 1, liquid lubricant 4 is dispersed between the polymeric matrix 2 and the fillers 1 coated with titanates or silane compounds. Liquid lubricant 4 not only facilitates the relative motion between the fillers 1 and the polymeric matrix 2 but also facilitates the relative motion between the fillers 1 and the steel shaft 3 so that the lubricating properties of the bearing members are greatly improved.

In addition, liquid lubricant 4 disposed between the matrix 2 (bearing member) and the steel shaft 3 functions as a transfer medium of force between the two rigid bodies. The thicker the liquid lubricants are, the better the lubrication is. However, due to the motion pressure, the layer of liquid lubricant 4 will be extruded and lost during the motion of the bearing members. In particular, when several kinds of liquid lubricants having poor affinity to the surfaces of the bearing member and steel shaft, or having poor compatabilities with each other are used, the liquid lubricants will be extruded from the friction interface, and this will result in the reduction of lubricating performance. Accordingly, 0.1-15 parts by weight of the liquid lubricants 4 should be polar compounds. The polar end of the polar compounds 4 (polar lubricants) will react with the hydroxy group at the surface of the steel shaft 3 allowing absorption of the polar lubricant 4 by the surface of the steel shaft 3. As the other end of each molecule of the polar lubricant is free, the surface of the steel shaft 3 will be coated with a layer of hydrocarbons. This layer of hydrocarbons has two functions, one is to protect the surface of the steel shaft 3, the other is to allow the liquid lubricants to easily be retained on the surface of steel shaft 3.

In order to improve the effect of the polar compounds (polar lubricants), preferably 0.15 to 15 parts by weight of the liquid lubricants are surfactants. The function of the surfactants is to assit the polar compounds in retaining liquid lubricant 4 on the surface of steel shaft 3. Some surfactants themselves act as excellent lubricants, for example, soapy water.

Accordingly, when the bearing members made from the composite material of the present invention, are used, because there are two isolation layers, i.e., the titanate (silane compound) layer and the polar lubricant layer, disposed between the bearing member and the shaft, the bearing is not in substantial contact with the shaft and excellent lubricating performance are obtainable.

The manufacturing process for the composite material of the present invention comprises first treating the surface of fillers or solid lubricants, and then homogeneously blending the polymeric materials, the liquid lubricants, and the polar compounds with the treated fillers. Alternatively, the composite material of the present invention can be prepared by blending the polymeric material, the fillers and the titanates (silane compounds) first, then adding in the liquid lubricants, polar compounds or surfactants and finally blending them well.

The method of treating the fillers with titanates or silane compounds includes the wet slurry method, the solution decomposition method, the vapor spray method, the coating method, the chlorinated silane steam treating method (dry film treating method) and the silane oxide sintering method. As these methods are all well known in this field, description of them is omitted.

The titanates used in the present invention are organic compounds of titanium, including the titanates of alkyl, alkylene, acyl, alcohol, amine, and acid; as well as chelated titanates. Examples of these are tetraisopropyl titanate, tetrakis-(2-ethylhexyl) titanate, triethanolamine titanate chelate, and latic acid titanate chelate.

The silane compounds used in the present invention include chlorinated silane compounds or siloxanes, for example, methyl phenyl dichlorosilane, trimethylchloro silane, dimethyl chloro silane, methyl trichlorosilane, dimethyl dimethyl siloxane, diethyl diethyl siloxane, trimethyl silane and the like.

The fillers used in the present invention include glass fibers, glass powders, carbon fibers, carbon blacks, graphites, $MoS_2$, PTFE, white carbons, calcium carbonate, alumina, and metal powder. The amount of solid and filler is in the range of 1-120 parts by weight, the most preferred condition is in the range of 3-50 parts by weight on the basis of 100 parts by weight of polymeric material. The amount of the titanates used for treating the fillers is 0.5-3.0 parts by weight on the basis of 100 parts by weight of the total weight of the fillers, and preferably less than 2 parts by weight. However, if the titanates are blended with the polymeric material, the amount used can be slightly increased.

The polymeric materials used in the present invention include thermoset resins such as phenil resin, urea resin, polyisocyanates, unsaturated polyester, dipropylene phthalate, epoxy, silicone, polyimide, furan resins, and thermoplastic resins such as polyvinyl chloride, polystyrene, ABS, polymethyl metacrylate, polypropylene oxide, polyethylene, polypropylene, polyamide, polycarbonate, polyacetal, polypropylene sulfide, and their mixtures.

The liquid lubricants used in the present invention include aromatic lubricant oil such as spindle oil, axle oil, turbin oil, motor oil, generator oil, synthesized lubricant oil such as naphthelene lubricant oil, paraffin lubricant oil, hydrocarbons, esters, polyethylene glycol, and silane oil. The amount of the liquid lubricant is 1-15 parts by weight based on 100 weight parts of the polymeric material. If the amount of the lubricant used is less than 1 parts by weight, the lubrication will be poor, and if the amount exceeds 15 parts by weight, the properties of the polymeric material will be damaged.

The polar compounds used in the present invention include higher fatty acids and their derivatives, for example, saturated fatty acids such as stearic acid, palmitic acid, octyl acid, undecanoic acid, dodecylic acid, myristicic acid, arachic acid, docosanoic acid, tetracosanoic acid, cerotic acid, montanic acid, melissic acid; unsaturated fatty acid such as oleic acids, gadoleic acid, ximerynic acid, linolic acid; methyl, ethyl, propyl, butyl, amyl, hexyl, heptyl, octyl, decyl, oleic alcohol, ester compounds of saturated and unsaturated fatty acids; aliphatic amides such as octanamide, decylamide, laurylamide, palmitamide, stearamide, eicosanoamide, the chlorides of the above mentioned compounds such as dichloro methyl stearate; the Li, Be, Mg, Ca, Sr, Cu, Zn, Cd, Al, Ce, Ti, Zr, Pb, Cr, Mn, Co, Ni, Fe, Hg, Tl, Sn soaps of stearic acid, oleic acid, palmitic acid, and camphoric acid; higher alcohols such as octyl alcohol, lauryl alcohol, cetyl alcohol, stearyl alcohol. oleyl alcohol and the like.

The amount used of the above polar compounds is 0.1-15 parts by weight based on 100 parts by weight of the polymeric material. If the amount is less than 0.15 parts by weight, the effect will not be satisfactory, and if the amount exceeds 15 parts by weight, the processability and molding of the composite material are not good.

The function of the surfactants is to promote chemical reaction of the polymeric material and the liquid lubricants. Any conventional surfactant can be used in the composite material of the present invention. The amount used should be 0.1-15 parts by weight based on 100 parts by weight of the polymeric material. If the amount is less than 0.1 parts by weight, it will be less effective. But, if the amount exceeds 15 parts by weight the performance of the composite material will decline.

EXAMPLES

The present invention is more specifically described by the following illustrative examples. However, it is to be understood that these examples are only described to illustrate the invention, but not to limit the scope of the present invention.

In these examples, the unsaturated polyester used is 375 GNC (Yung Chun Co.), the initiator used is methylethyl peroxyketone, the titanate used is TYZOR TE (E.I. Du Pont de Nemours Co.), the glass powder used is a product of Potters Industries Inc., the white carbon used is CAB-O-SIL M5 (Cabot Co.), the carbon black used is Monarch 880 (Cabot Co.), the graphite and paraffin oil used are the products of Shimaku Pharmaceutical Co., the motor oil used is the product of China Petroleum Co., the cetyl alcohol and palmitic acid used are the product of Hayashi Pure Chemical Co., the copper palmate used is self synthesized, the ethanol and isopropyl alcohol used are products of Wako Pharmaceutical Co., ethyl oleate used is the product of E Merk Co., and the silane compounds used are the product of the Shinetsu Chemical Co.

EXAMPLE 1

50 parts by weight of glass powder were first treated with 1.2 parts by weight of titanate, the treated glass powder was then mixed with 100 parts by weight of unsaturated polyester (containing 1 part by weight of initiator), 10 parts by weight of cetyl alcohol. The resulting composite material was filled into a cylindrical die having an inner diameter of 4 cm, an outer diameter of 5 cm and a length of 3 cm to fabricate into ring bearing samples, and the bearing samples were heated to form test samples. The friction coefficient of these samples were tested by radial thrust tester with a load of 10 Kg/cm$^2$ and a speed of 3.8 m/min.

EXAMPLE 2

50 parts by weight of glass powder were first treated with 1.2 parts by weight of titanate. The treated glass powder was then mixed with 100 parts by weight of unsaturated polyester (containing 1 parts by weight of initiator), 6 parts by weight of motor oil. The resulting composite material was made into test samples and tested for the friction coefficient by the same method as described in Example 1.

EXAMPLE 3

4 parts by weight of white carbon were first treated with 0.08 parts by weight of titanate, and then mixed the treated white carbon with 100 parts by weight of unsaturated polyester (containing 1 part by weight of initiator), 10 parts by weight of palmitic acid. The resulting composite material was fabricated into test samples and tested for the friction coefficient by the same method as described in Example 1.

EXAMPLE 4

4 parts by weight of white carbon were first treated with 0.08 parts by weight of titanate, and then mixed the treated white carbon with 100 parts by weight of unsaturated polyester (containing 1 parts by weight of initiator), and 4 parts by weight of paraffin. The resulting composite material was made into test samples and tested for friction coefficient by the same method as described in Example 1.

EXAMPLE 5

6 parts by weight of carbon black were first treated with 0.12 parts by weight of titanate, and then mixed the treated carbon black with 100 parts by weight of unsaturated polyester (containing 1 part by weight of initiator), and 10 parts by weight of palmitic acid. The resulting composite material was made into test samples and tested for friction coefficient by the same method as described in Example 1.

EXAMPLE 6

6 parts by weight of carbon black were first treated with 0.12 parts by weight of titanate, and then mixed the treated carbon black with 100 parts by weight of unsaturated polyester (containing 1 part by weight of initiator), 6 parts by weight of motor oil. The resulting composite material was made into test samples and tested for friction coefficient by the same method as described in Example 1.

EXAMPLE 7

6 parts by weight of graphite were mixed with 100 parts by weight of unsaturated polyester (containing 1 part by weight of initiator). The resulting composite material was made into test samples and tested for the friction coefficient by the same method as described in Example 1.

EXAMPLE 8

The kinds and amounts of components used in this example are the same as that of Example 7, except the graphite was treated with 0.12 parts by weight of titanate before being mixed with other components. The resulting composite material was made into test samples and tested for friction coefficient by the same method as described in Example 1.

EXAMPLE 9

The same kinds and amounts of components as in Example 8 are used, except 7 parts by weight of copper palmate was added. The resulting composite material was fabricated into test samples and tested for friction coefficient by the same method as described in Example 1.

EXAMPLE 10

6 parts by weight of graphite were first treated with 0.12 parts by weight of titanate and then mixed with 100 parts by weight of unsaturated polyester (containing 1 part by weight of initiator) and 6 parts by weight of motor oil. The resulting composite material was fabricated into test samples and tested for friction coefficient by the same method as described in Example 1.

EXAMPLE 11

The same kinds and amounts components and amount as in Example 10 are used, except 2 parts by weight of ethyl oleate was further added. The resulting composite material was made into test samples and tested for friction coefficient by the same method as described in Example 1.

EXAMPLE 12

10 parts by weight of carbon black were first treated with 0.02 parts by weight of titanate, and then mixed with 100 parts by weight of epoxy resin (BE-188, Chang Chun Chemical Co.), 10 parts by weight of hardener (No. 1040, Shell Co.), and 8 parts by weight of copper palmate. The resulting composite material was made into test samples and tested for friction coefficient by the same method as described in Example 1.

EXAMPLE 13

100 parts by weight of polyoxymethylene (Asahi Chemical Industry Co., Ltd.), 6 parts by weight of graphite, 0.12 parts by weight of titanate, and 6 parts by weight of copper palmate were blended and made into test samples by injection molding. The samples were tested for friction coefficient by the same method as described in Example 1.

The results of Examples 1 to 13 are listed in the Table 1.

TABLE 1

| Example No. | 1 | 2 | 3 | 4 | 5 | 6 | 7 |
|---|---|---|---|---|---|---|---|
| Friction Coefficient | 0.02 | 0.031 | 0.028 | 0.03 | 0.029 | 0.03 | 0.1 |
| Example No. | 8 | 9 | 10 | 11 | 12 | 13 | |
| Friction Coefficient | 0.06 | 0.024 | 0.031 | 0.028 | 0.04 | 0.025 | |

Table 1 shows that bearing samples made with the composite material of the present invention (Examples 1-6 and Examples 9-13) have lower friction coefficients, while the bearing samples in Examples 7 and 8 have friction coefficients higher than 0.05.

The bearing samples of Examples 9, 12 and 13 were also tested for long term durability, and were found to possess excellent lubrication properties. Load and speed were also varied to obtain the PV value for the bearing samples of Example 9 (polyester), Example 12 (Epoxy) and Example 13 (Polyoxymethylene). The PV value for bearing samples made from Epoxy matrix reached a value of 6500 Kgf/cm$^2$ m/min, which is three times of the value of commercially available self-lubricating bearing members; the PV value for bearing samples made from polyoxymethylene matrix was about 3000 kgf/cm$^2$ m/min, and the PV value for bearing samples made from unsaturated polyester was about 2500 kgf/cm$^2$ m/min.

EXAMPLE 14

The same kinds and amounts of components as in Example 2 were used, except 2 parts by weight of zinc stearate was further added. The resulting composite material was made into test samples and tested for friction coefficient by the same method as described in Example 1.

EXAMPLE 15

The same kinds and amounts of components as in Example 3 were used, except 3 parts by weight of motor oil was added. The resulting composite material was made into test samples and tested for friction coefficient by the same method as described in Example 1.

EXAMPLE 16

The same kinds and amounts of components as in Example 4 were used, except 1 parts by weight of sorbitan ester was added. The resulting composite material was made into test samples and tested for friction coefficient by the same method as described in Example 1.

COMPARATIVE EXAMPLE 1

Several commercial self-lubricating bearing members (#80 Japan oiless Co., matrix: Polyoxymethylene) were tested for friction coefficient by the same method as described in Example 1.

The results of Examples 14 to 16 and Comparative Example 1 are listed in Table 2.

TABLE 2

| Example No. | 14 | 15 | 16 | Comp. Ex. 1 |
|---|---|---|---|---|
| Friction coefficient | 0.028 | 0.026 | 0.027 | 0.06 |

Table 2 shows that friction coefficients of the bearing samples made with the composite material of the present invention are only about ½ of the friction coefficients for commercial self-lubricating bearing members.

EXAMPLE 17

5 parts by weight of graphite were treated with 0.05 parts by weight of dimethyldichlorosilane by wet slurry method, and then mixed with 100 parts by weight of epoxy resin, 10 parts by weights of hardener, 3 parts by weight of copper palmate and 6 of motor oil. The resulting composite material was dried, made into test samples, and tested for friction coefficient by the same method as described in Example 1.

EXAMPLE 18

6 parts by weight of carbon black were treated with 0.06 parts by weight of ethylphenoldichlorosilane by the wet slurry method, and then mixed with 100 parts by weight of unsaturated polyester, and 1 part by weight of MEK peroxide. The resulting composite material was dried, made into test samples, and tested for friction coefficient by the same method as described in Example 1.

EXAMPLE 19

The same kinds and amounts of components as in Example 18 were used, except 10 parts by weight of ocetyl alcohol was added. The resulting composite material was dried, made into test samples and tested for friction coefficient by the same method as described in Example 1.

EXAMPLE 20

5 weight parts of graphite were treated with 0.05 parts by weight of diethyl dichlorosilane by the wet slurry method, and then mixed with 100 parts by weight of unsaturated polyester (SN 35, Yung Chun Industrial Co.,), 1 part by weight of MEK peroxide, and 1 weight part of lithium stearate. The resulting composite material was dried, made into test samples, and tested for friction coefficient by the same method as described in Example 1.

EXAMPLE 21

50 parts by weight of Cu-Al alloy powder were treated with 0.5 parts by weight of diethyl dichlorosilane by the wet slurry method, and then mixed with 100 parts by weight of polyoxymethylene, 0.5 weight parts of zinc stearate, 6 parts by weight of motor oil and 0.5 parts by weight of nonionic surfactants. The resulting composite material was dried, made into test samples, and tested for friction coefficient by the same method as described in Example 1.

EXAMPLE 22

The same kinds and amounts of components as in Example 21 were used, except the diethyldichlorosilane was omitted. The resulting composite material was dried, made into test samples, and tested for friction coefficient by the same method as described in Example 1.

The results of Examples 17 to 21 and comparative Example 2 are shown in the Table 3.

TABLE 3

| Ex. No. | 17 | 18 | 19 | 20 | 21 | Comp. Ex. |
|---|---|---|---|---|---|---|
| Friction Coefficient | 0.03 | 0.035 | 0.04 | 0.03 | 0.06 | 0.18 |

Table 3 shows that fillers treated with silane compounds can also be used according to the present invention and the friction coefficients of the bearing members made by the composite material of the present invention are lower than that of comparative Example 2.

What is claimed is:

1. A self-lubricating composite material comprising:
   100 parts by weight of polymeric materials;
   1-15 parts by weight of liquid lubricants, wherein 0.1-15 parts by weight of said liquid lubricants are polar compounds; and
   about 4-100 parts by weight of filler or solid lubricants wherein said fillers or solid lubricants have been treated with 0.2-3 parts by weight of titanates or silane compounds on the basis of 100 parts by weight of fillers or solid lubricants.

2. A self-lubricating composite material comprising:
   100 parts by weight of polymeric materials;
   1-15 parts by weight of liquid lubricants, wherein 0.1-15 parts by weight of said liquid lubricants are surfactants; and
   about 4-100 parts by weight of fillers or solid lubricants wherein said fillers or solid lubricants have been treated with 0.2-3 parts by weight of titanates or silane compounds on the basis of 100 parts by weight of fillers or solid lubricants.

3. A self-lubricating composite material as claimed in claim 1, wherein said polymeric material is selected from the group consisting of poly resin, urea resin, polyisocyanates, unsaturated polyester, dipropylene phthalate, epoxy, silicone, polyimide, furan resins, polyvinyl chloride, polystyrene, ABS, polymethyl methacrylate, polypropylene oxide, polyethylene, polypropylene, polyamide, polycarbonate, polyacetal, and polyphenylene sulfide.

4. A self-lubricating composite material as claimed in claim 1, wherein said liquid lubricant is selected from the group consisting of spindle oil, axle oil, turbine oil, motor oil, generator oil, naphthelene lubricant oil, paraffin lubricant oil, hydrocarbons, esters, polyethylene glycol, and silane oil.

5. A self-lubricating composite material as claimed in claim 1, wherein said polar compound is selected from the group consisting of stearic acid, palmitic acid, octyl acid, undecanoic acid, dodecyclic acid, myristicic acid, arachic acid, docosanoic acid, tetracosanoic acid, cerotic acid, montanic acid, melissic acid, oleic acid, gadoleic acid, ximerynic acid, and linolic acid; methyl, ethyl, propyl, butyl, amyl, hexyl, heptyl, octyl, decyl, and oleic alcohol ester compounds of saturated and unsaturated fatty acids; octanamide, decylamide, laurylamide, palmitamide, stearamide, and eicosanoamide; dichloro methyl stearate; Li, Be, Mg, Ca, Sr, Cu, Zn, Cd, Al, Ce, Ti, Zr, Pb, Cr, Mn, Co, Ni, Fe, Hg, Tl, and Sn soaps of stearic acid, oleic acid, palmitic acid and camphoric acid; octyl alcohol, lauryl alcohol, cetyl alcohol, stearyl alcohol, and oleyl alcohol.

6. A self-lubricating composite material as claimed in claim 1, wherein said filler or solid lubricant is selected from the group consisting of glass fibers, glass powder, carbon fibers, carbon blacks, graphites, $MoS_2$, PTFE, white carbons, calcium carbonate, alumina, and metal powder.

7. A self-lubricating composite material as claimed in claim 1, wherein said titanates are alkyl, alkylene, acyl, alcohol, amine acid and chelated titanates.

8. A self-lubricating composite material as claimed in claim 1, wherein said silane compound is selected from the group consisting of methylphenyl dichloro silane, trimethylchloro silane, dimethyl chloro silane, methyl trichloro silane, dimethyl dimethyl siloxane, diethyl diethyl siloxane, and trimethyl silane.

9. A self-lubricating composite material as claimed in claim 2, wherein said polymeric material is selected from the group consisting of phenol resin, urea resin, polyisocyanates, unsaturated polyester, dipropylene phthalate, epoxy resin, silicone, polyimide, furan resins, polyvinyl chloride, polystyrene, ABS, polymethyl, methacrylate polypropylene oxide, polyethylene, polypropylene, polyamide, polycarbonate, polyacetal, and polyphenylene sulfide.

10. A self-lubricating composite material as claimed in claim 2, wherein said liquid lubricant is selected from the group consisting of spindle oil, axle oil, turbine oil, motor oil, generator oil, naphthelene lubricant oil, paraffin lubricant oil, hydrocarbons, esters, polyethylene glycol, and silane oil.

11. A self-lubricating composite material as claimed in claim 2, wherein said filler or solid lubricant is selected from the group consisting of glass fibers, glass powder, carbon fibers, carbon blacks, graphites, $MoS_2$, PTFE, white carbons, calcium carbonate, alumina, and metal powder.

12. A self-lubricating composite material as claimed in claim 2, wherein said titanates are alkyl, alkylene, acyl, alcohol, amine acid and chelated titanates.

13. A self-lubricating composite material as claimed in claim 2, wherein said silane compound is selected from the group consisting of methylphenyl dichloro silane, trimethylchloro silane, dimethyl chloro silane, methyl trichloro silane, dimethyl dimethyl siloxane, diethyl diethyl siloxane, and trimethyl silane.

* * * * *